United States Patent [19]

Kucmerowski

[11] Patent Number: 5,235,366
[45] Date of Patent: Aug. 10, 1993

[54] SINGLE USE PHOTOGRAPHIC FILM PACKAGE AND CAMERA

[75] Inventor: Douglas E. Kucmerowski, Spencerport, N.Y.

[73] Assignee: Eastman Kodak Company, Rochester, N.Y.

[21] Appl. No.: 848,368

[22] Filed: Mar. 9, 1992

[51] Int. Cl.$^5$ .............................................. G03B 1/00
[52] U.S. Cl. .................................................. 354/212
[58] Field of Search .................... 354/75, 76, 212–218, 354/288

[56] References Cited

U.S. PATENT DOCUMENTS

| | | | |
|---|---|---|---|
| 3,136,291 | 6/1964 | Irisawa et al. | 116/213 |
| 4,884,087 | 11/1989 | Mochida et al. | 354/75 |
| 4,954,857 | 9/1990 | Mochida et al. | 354/75 |

*Primary Examiner*—Michael L. Gellner
*Assistant Examiner*—Howard B. Blankenship
*Attorney, Agent, or Firm*—Joseph F. Breimayer; Roger A. Fields

[57] ABSTRACT

A recyclable, single use photographic film package and camera comprising a light-tight film casing having an exposure opening, a roll of unexposed film withdrawn from its canister and wound on a film winding reel disposed on one side of the exposure opening in the light-tight casing, the canister disposed on the other side of the exposure opening in the light-tight film casing, and an externally operable film winding thumbwheel for winding the film past the shutter and image area and into its canister as the film is exposed frame by frame. When all frames are exposed, the package is recycled after processing the exposed film by substituting a fresh roll of film and new packaging for resale. To prevent unauthorized reuse of the camera by refilling it with other than genuine film, a component of the film frame counter is intentionally damaged upon winding the last frame into the film canister which renders the exposure counter unusable until the component is replaced by an authorized recycler of the film package.

10 Claims, 3 Drawing Sheets

SINGLE USE PHOTOGRAPHIC FILM PACKAGE AND CAMERA

BACKGROUND OF THE INVENTION

1. Field of the Invention

The present invention relates to a recyclable, single use, lens fitted photographic film package and more particularly to a method and apparatus for rendering the camera mechanism non-reusable upon exposure of the film contained therein while allowing reuse by an authorized party by replacement of damaged components thereof.

2. Description of the Prior Art

Photographic film packages containing a single roll of film installed in a recyclable, lens-fitted camera intended for single use, as typified by the "KODAK" Fun Saver 35," have gained popularity in recent years for use by photographic enthusiasts on the spur of the moment. Such lens fitted photographic film packages comprise the elements of a camera fitted with an exposure lens, a simple exposure mechanism which includes a film winding mechanism, a shutter mechanism and a 110 or a 35 millimeter size cartridge or canister packaged within the camera which can be sold wherever photographic film is sold for such spontaneous use. After the exposure of all frames of the film in the package, it is returned to a photo shop or photo laboratory without removing the film. There, the film package is opened, and the exposed film is developed to make prints therefrom while the paper packaging and mechanism without the film is either scrapped or returned to the manufacturer for recycling. The prints, together with the developed film, are returned to the customer. Such a lens-fitted single use film package makes it easy to take pictures because there is no need for film loading and unloading, and the cost is relatively low. Such a single use camera and photographic film package is disclosed in U.S. Pat. Nos. 4,954,857 and 4,884,087.

In those film packages which employ 35 millimeter film, the film strip is withdrawn from the 35 millimeter film canister or cartridge and prewound around a film winding reel during manufacture so that, in use, the film strip is advanced back into the canister as each image frame is exposed. It is therefore unnecessary to provide the camera mechanism with a rewind capability which would otherwise increase its cost and complexity.

The camera mechanisms employed in film packaging of this type are typically provided with a thumb actuated film advance wheel or thumbwheel which moves one filmstrip into the film canister one frame at a time which in turn moves a cam causing a picker to decrement a frame counter wheel by one count (exposure). The remaining unexposed frames are indicated to the user by the number on the counter wheel appearing in an aperture in the paper packaging overlying the camera mechanism. When the user is ready to take a picture, the film advance thumbwheel is wound in the direction indicated on the package until it stops. In that process, the moving film advances a sprocket which in turn moves a cam causing a picker to decrement the counter wheel by one count. When the last exposure frame is exposed, the user is instructed to continue to wind the thumbwheel until the counter reads "zero" which ensures that the exposed frames are wound completely into the film canister. Since there is no mechanism provided to withdraw the film from the canister, the camera mechanism is rendered unusable by the average amateur photographer. Thereafter, the entire package is submitted for development and printing of the film as indicated above.

The photographic film industry is highly competitive, and over the years instances of passing off of counterfeit film canisters have been uncovered. In single use cameras of the type described, it is not possible for a consumer to view the film canister actually installed within the camera mechanism which itself is enclosed within the outer package. Consequently, the camera mechanisms and external packaging identifying the genuine manufacturer are all that the consumer has to rely on that the film within the package is genuine. While the manufacturer makes an effort to have film processors return the film packages for recycling, the packages may become diverted to others who refill, repackage and resell the film package with counterfeit film at a considerable profit. There is a need for a simple mechanism to discourage such unfair competitive acts, and ensure consumers of the quality and reliability they expect to receive when purchasing the branded film package.

SUMMARY OF THE INVENTION

It is, therefore, an object of the present invention to provide a recyclable, single use film package and camera mechanism which cannot be reused without the replacement of certain key components.

It is a further object of the present invention to provide a method and apparatus for causing minor damage to the camera mechanism after exposure of all image frames of the photographic film strip to inhibit unauthorized reuse thereof.

These and other objects of the present invention are realized in a method and apparatus for damaging the camera mechanism of a recyclable, single use, photographic film package of the type fitted with a lens, a shutter release mechanism, a film advance mechanism and an exposure counter and containing a roll of unexposed film, wherein the film is advanced past an exposure image area, the remaining exposures are indicated by the exposure counter and the film is exposed by the operation of the shutter release successively until all frames are exposed, whereupon a component of the camera is damaged to prevent its reuse without replacement of the damaged component.

In a preferred embodiment of the present invention, the camera is provided with a thumbwheel operated by the user to advance the film and rotate of a sprocket wheel having teeth engaging the perforations in the edge of the film strip which in turn moves a cam causing a picker to decrement the counter wheel by one count or exposure. As the film is wound into the film canister after all the exposures have been made, the counter wheel counts to "zero". The circumference of the counter wheel is provided with teeth that engage with the picker rotated by the cam and sprocket except at one location where the tooth is replaced by a solid tab which interferes with the picker such as to bend or shear it off from the cam as the zero count is reached. The camera is thus rendered unusable until the cam with an intact picker is replaced in the recycling of the camera after being returned to the manufacturer by the film processor.

BRIEF DESCRIPTION OF THE DRAWINGS

The above and other objects and features of the invention will become apparent from the following detailed description taken in conjunction with the preferred embodiments thereof with reference to the accompanying drawings in which like parts are designated by like numerals throughout the views of the drawings and wherein.

DETAILED DESCRIPTION OF THE PREFERRED EMBODIMENTS

Figure 1:
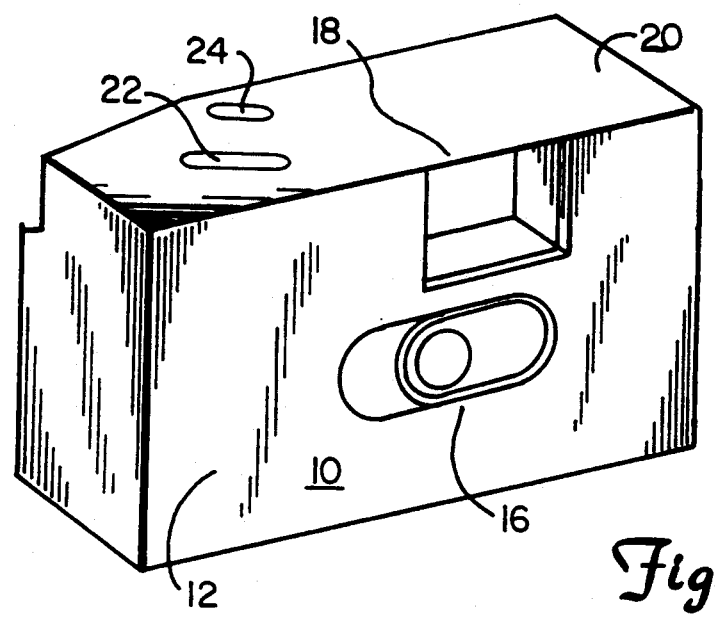
FIG. 1 is a front perspective view of a the recyclable single use photographic film package in which the present invention may be implemented.
Figure 2:
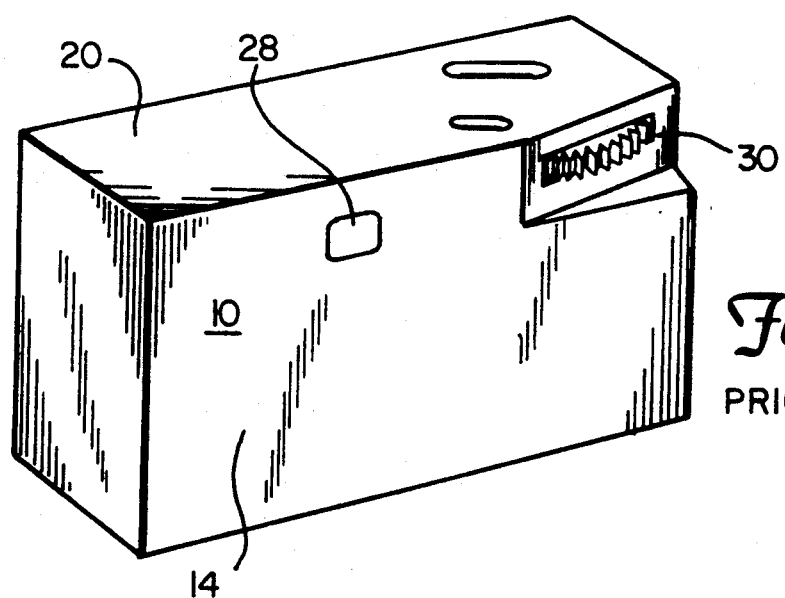
FIG. 2 is a rear perspective view of the photographic film package of FIG. 1.

Referring now to FIGS. 1 and 2, there is shown therein a lens fitted photographic film package of a type known in the prior art in which the improvements of the present invention may be implemented. The exterior film package 10 is preferably made of cardboard and illustrated with trademarks and graphics of the manufacturer and comprises a main front cover section 12 and a back cover section 14 which forms a light-tight box shaped camera mechanism and film container except in the cutout openings to be described. The main front body section 12 is provided with openings for an exposure lens 16 and a view finder window 18. The top wall 20 has a pair of openings 22, 24 therein for receiving the shutter release button and for viewing the underlying exposure counter number, respectively. A view finder eyepiece opening 28 is provided in the back cover section 19 for the view finder. A thumbwheel opening 30 is provided for access to a thumbwheel 61 for film advance by the user. A film package of this type presently available from Eastman Kodak Company as the Fun Saver 35 and in other similar configurations.

Figure 3:
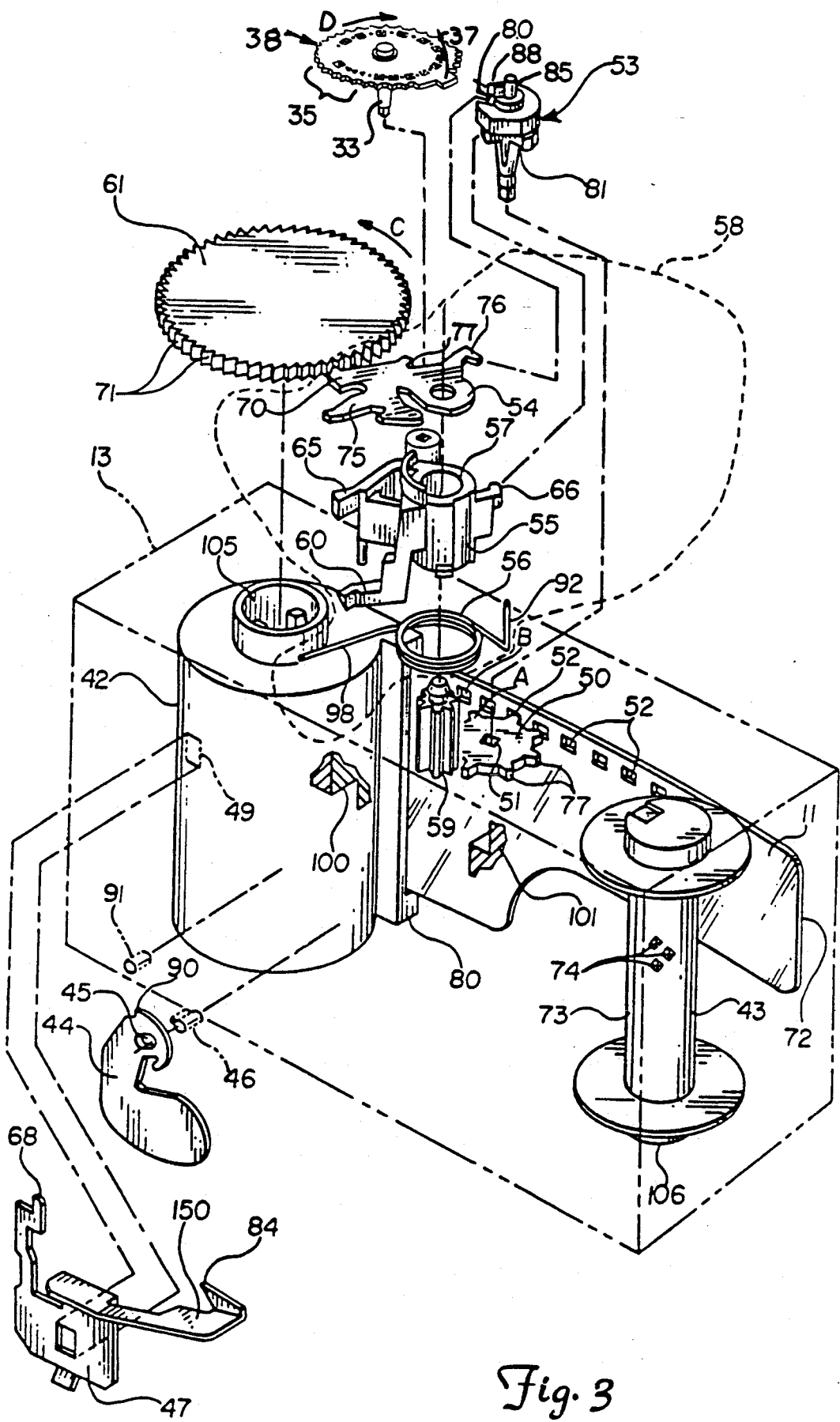
FIG. 3 is an exploded perspective view of the recyclable camera mechanism and film cartridge contained within the photographic film package of FIGS. 1 and 2 illustrating the prior art film counter, picker and cam.

Turning now to Figure 3, it depicts in an exploded perspective view the major components of the camera mechanism within a light-tight plastic camera body 13 which is not specifically illustrated for purposes of simplicity. Figure 3 is a perspective representation of the components of camera body 13 that are used to initially wind filmstrip 11 from canister 42 around film reel 43 and to rewind the filmstrip 11 back into the canister 42 each time an exposure of a frame is made. Shutter blade 44 contains an orifice 45 and frame post 46 is connected to the frame (not shown) of camera body 13. Frame post 46 is placed within orifice 45. A shutter spring (not shown) is used to hold blade 44 in the orientation shown in FIG. 3, yet allow blade 44 to move in a clockwise direction. Trigger latch 47 has an arm 68 and arm 150. Arm 150 has a latch point 84. Trigger latch 47 is positioned to the frame of camera body 13 at tab 49. Sprocket 50 has an opening 51 at its center and teeth 77 along its circumference.

Cam 53 has recesses 80 and 81 and is dropped through a hole in the frame of camera body 13 (not shown) and pushed into opening 51 of sprocket 50. Metering lever 55 has legs 60, 65 and 66 protruding from its hub. High energy assembly 58 comprises high energy lever 55, metering lever 54 and high energy spring 56. High energy spring 56 is assembled to high energy lever 55 and then metering lever 54 is assembled to top surface 57 of lever 55 and retained by spring leg 92 of high energy spring 56. Assembly 58 is positioned over frame post 59 of camera body 13. Then leg 98 of spring 56 is placed beneath overhanging ledge 100. Ledge 100 is located in the frame of camera body 13. When leg 98 is placed in ledge 100, assembly 58 rotates about frame post 59 until high energy leg 60 pushes against opposite frame wall 101 of camera body 13 or leg 66 pushes against cam 53. Thumbwheel 61 is placed in an orifice in the frame of camera body 13 so that thumbwheel teeth 71 push against anti-back-up leg 68 of trigger latch 47. In the above position metering leg 70 of metering lever 54 is aligned with teeth 71 of thumbwheel 61. End 72 of filmstrip 11 from cartridge 42 is pressed through slot 73 of film roll 43 and retained by pressure darts 74 (that are affixed to roll 43). Cartridge 42 and film reel 43 are placed on the back of the frame of camera body 13 so that spool 105 of canister 42 meshes with a projection (not shown) on the bottom of thumbwheel 61 by passing through an orifice in the frame of camera body 13, and film sprocket hole 52 meshes with a tooth 77 or sprocket 50.

The initial prewinding or withdrawal of filmstrip 11 out of canister 42 and onto film reel 43 is accomplished during initial assembly or recycling by pushing leg 65 of lever 55 to the left so that leg 66 is not touching cam 53. Leg 75 of metering lever 54 is pushed to the right so that leg 76 of lever 54 is not touching cam 53 and leg 70 of lever 54 is not touching thumbwheel 61. Anti-back-up leg 68 of latch 47 is pulled away from thumbwheel 61 clearing thumbwheel teeth 71. At this point, filmstrip 11 may be driven from cartridge 42 onto film reel 43.

An automatic prewind device like a powered screwdriver (not shown) meshes with slot 106 of film reel 43, rotating reel 43 in a clockwise direction (as viewed from above). Filmstrip 11 is pulled from canister 42 causing thumbwheel 61, sprocket 50 and cam 53 to spin freely. Each subsequent tooth 77 on sprocket 50 meshes with a subsequent sprocket hole 52. Thus, tooth A of sprocket 50 will mesh with sprocket hole B. The prewind process continues until most of the remaining filmstrip 11 contained in canister 42 has been unwound from cartridge 42, and the tape which attaches the end of filmstrip 11 to spool 105 of canister 42 is pulled partially through slot 89 of canister 42. High energy lever 55, metering lever 54 and anti-back-up leg 68 of trigger latch 47 are then released.

Subsequent winding of filmstrip 11 is accomplished by having the camera operator's thumb or a mechanical substitute rotate thumbwheel 61 in the direction shown by arrow C. The thumbwheel rotates spool 105 of canister 42, thereby pulling filmstrip 11 into canister 42 and causing film reel 43, sprocket 50 and cam 53 to rotate. The rotation of cam 53 causes leg 66 of high energy lever 55 to move out of recess 81 which in turn causes lever 55 to rotate thereby forcing leg 65 and leg 60 to move past trigger latch point 84 and shutter blade trip point 90, respectively.

Metering of filmstrip 11 is accomplished during the continued rotation of cam 53 through 360°. The operator winds thumbwheel 61 until recess 81 of cam 53 has again aligned itself with leg 66 of high energy lever 55. At this point the force from high energy spring 56 causes high energy lever 55 to snap backwards allowing leg 65 of high energy lever 55 to pull back against latch point 84 of trigger latch 47.

A fraction of a revolution after the foregoing, leg 76 of metering lever 54 encounters recess 80 in cam 53. The force from leg 92 of high energy spring 56 causes metering lever 54 to snap backwards, driving leg 70 of metering lever 54 sharply into engagement with teeth 71 on rotating thumbwheel 61. The above actions lock thumbwheel 61, preventing the operator from pulling more of filmstrip 11. The total length of film pulled is equivalent to the distance between eight sprocket holes 52 since there are eight teeth 77 on sprocket 50.

Frames on filmstrip 11 are exposed by depression of the shutter button (FIGS. 1 and 2) of camera body 13 which pushes leg 150 of trigger latch 47 down until leg 65 of high energy lever 55 is released. High energy spring 56 rotates high energy lever 55 such that leg 60 of lever 55 hits trip point 90 on shutter blade 44 causing blade 44 to rotate upwards, hit frame post 91 of camera body 13 and rebound back to its initial position. High energy lever 55 continues to rotate until leg 60 hits rigid frame wall 101.

Meanwhile, leg 92 of high energy spring 56 which is hooked near leg 75 of metering lever 54 pulls leg 70 of metering lever 54 out of engagement with teeth 71 of thumbwheel 61. This allows the user to advance the filmstrip 11 to the next frame by rotating thumbwheel 61.

Turning now to the exposure counter 38, it comprises a circular disc shaped face inscribed with numbers 0 through 12, 24, or 36 (the total number of available film frames) and apt to be rotated on axle 33 to present the remaining frame number in aperture 24 (FIGS. 1 and 2) by rotation of cam 53 and picker 88. Axle 33 is supported in a bore formed in the frame of camera body 13 (not shown). As described above, cam 53 rotates through 360° during film winding. Once each revolution, picker 88 engages a tooth 35 of exposure counter 38 and causes it to rotate one tooth position and present a new, decremented number in aperture 24. Picker 88 disengages from tooth contact at the beginning of film advance (after the previous exposure) when rotation of cam 53 drives leg 76 out of recess 80. At that same point, leg 78 disengages a hook (hidden beneath the face of counter 38) on axle 33 allowing counter 38 to rotate in the direction of arrow D. As cam 53 continues to rotate, picker 88 comes into contact with the next tooth 35, causing counter 38 to rotate until leg 76 again falls into recess 80, causing metering lever 54 to snap back and leg 77 to engage the hook on axle 33 and lock counter 38.

When the final frame is exposed and the filmstrip 11 is wound back into canister 42 as described above, tab 37 projecting outward of the teeth 35 engages upwardly projecting axle shaft 85 of cam 53. Picker 88 rotates freely in the widened gap between the side of tab 37 and the adjacent tooth. Thus, any further rotation of cam 53 does not affect counter wheel 38.

The camera mechanism as described above represents the prior art technology. In accordance with a preferred embodiment of the present invention, the interaction of the tab 37 and picker 88 is affected by changes made to each to cause the cam 53 to be damaged as the film stop 11 is wound to "zero" and into canister 42.

Figure 4B:
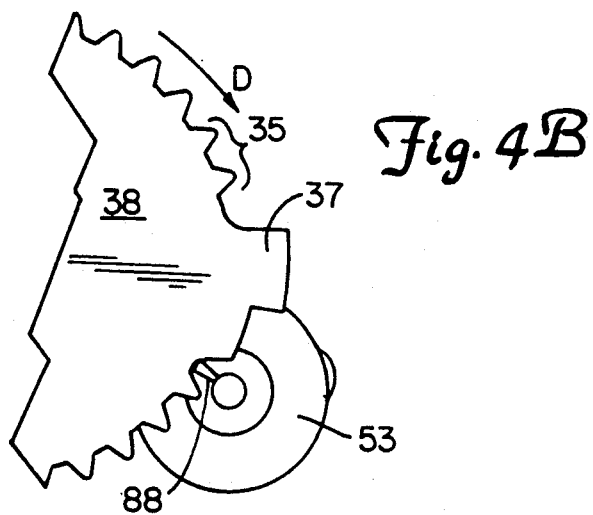
FIGS. 4A–4C are top views of a film counter, picker and cam of the present invention illustrating the process by which the picker is sheared from the cam in the final position of the frame counter.
Figure 4A:
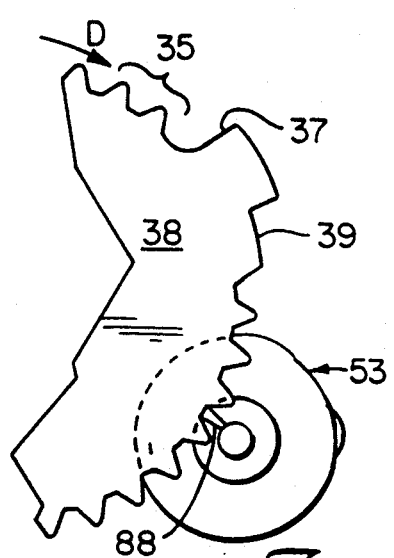
Figure 4C:
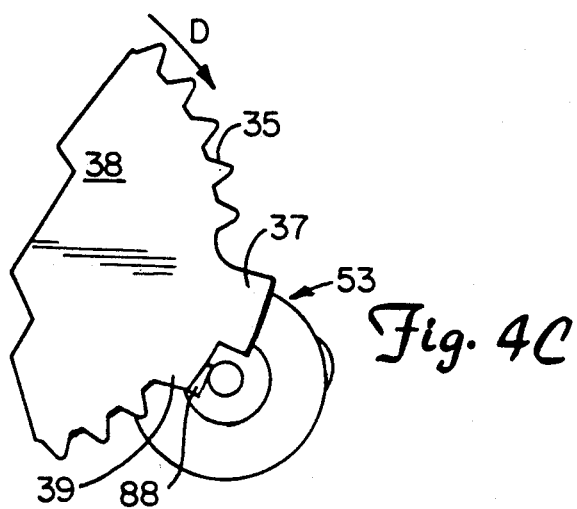

Turning now to Figures 4A–4C, they illustrate three positions of the cam 53 and picker 88 in relation to the exposure counter 38 of the present invention. The exposure counter 38 of the present invention includes a widened tab 37 which differs from the tab 37 depicted in FIG. 3 in that an additional portion 39 fills the space of the adjacent last tooth on the circumference of the exposure counter 38. In addition, the picker 80 at the point where it joins the axle of the cam 53 is narrowed (as shown in Fig. 5) so as to be readily bent over if pressure is exerted laterally against its sidewalls.

In FIG. 4A, the counter wheel 38 is depicted in a position near the last remaining unexposed frames and advancing frame by frame toward the zero count.

In FIG. 4B, the picker 80 is shown in the exposure frame number "1" position in the last tooth before the widened tab 39. FIG. 4C illustrates the shearing force applied by the widened tab 39 against the sidewall of the picker 88 in the "0" frame position. At that point, the user is unable to advance the film any further by action of the tab 37.

Figure 5:
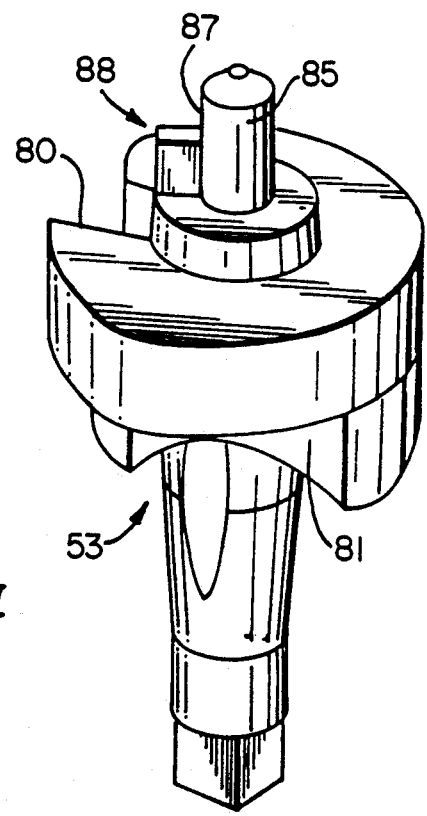
FIG. 5 is an expanded perspective view of the picker and cam.

Referring now to FIG. 5, it illustrates the cam 53 and picker 88, particularly the narrowed and weakened attachment of the plastic tab at joint 87 to the upright pin 85. The cam 53 and picker 88 is a unitary plastic component that may be manufactured by conventional injection molding techniques to effect the weakened joint 87.

The permanent deformation of the picker 88 renders it unable to advance the counter wheel 88 even after the count is reset upon reloading the camera mechanism with new film and winding it onto the reel 43 for reuse. It is thus necessary in this case to replace the cam 53. In this fashion, the film package is rendered unusable unless a new cam 53 is obtained.

At the least, this inhibits reloading of the camera with new film by consumers and amateur photographers and encourages the authorized recycling that maintains overall low cost and related consumer prices.

The above specification describes a new and improved method and system for providing a latent image of information on successive imaging areas of an unexposed filmstrip so that when a picture is subsequently taken on a specific imaging area, information will appear at the same location on each print of slide. It is realized that the above description may indicate to those skilled in the art additional ways in which the principles of this invention may be used without departing from the spirit. It is, therefore, intended that this invention be limited only by the scope of the appended claims.

What is claimed is:

1. A lens-fitted photographic film package having an externally operable shutter member for effecting an exposure and an externally operable film advance member for advancing to the next exposure frame after making an exposure comprising:

a light tight film casing having a shutter opening through which said exposure is made when said externally operable shutter member is operated;

an unexposed filmstrip disposed in a roll on one side of said opening in said light-tight casing;

a removable, light tight film container having a film winding spool therein disposed on the opposite side of said opening in said light tight casing from said film roll, one end of said filmstrip being attached to said film winding spool; and winding control means responsive to operation of said externally operable advance member for allowing said film winding spool to rotate so as to enable said filmstrip to be advanced by only one frame after every exposure, said winding control means includinq means responsive to the winding of the last exposure of the filmstrip into said light-tight film container for effecting permanent damage to a portion of said winding control means to prevent the effective reuse of the photographic film package.

2. The lens fitted photographic film package of claim 1 wherein said winding control means further comprises:
camming means driven by movement of said filmstrip past said opening and providing at least one camming surface and a picker element;
lever means adapted to be engaged against said camming surface for effecting release of said externally operable frame advance member after operation of said externally operable shutter member for allowing said filmstrip to be advanced past said opening until said camming means reaches its initial position and thereafter locking said film advance member;
frame counter means driven by said picker of said camming means, said frame counter being provided with indications designating a series of frame numbers, one of which is adapted to be viewed at a time by the user; and
means associated with said frame counter for damaging said camming means upon winding the last exposure on the filmstrip into said light-tight film container and when said frame counter indicates no film frame capable of being exposed remaining.

3. The lens-fitted photographic film package of claim 2 wherein said frame counter further comprises:
a flat disk having a series of evenly spaced teeth on its periphery adapted to be engaged by said picker element during each rotation of said camming means to advance a further decremented number into view by the user; and
damaging means carried by said counter disk in a location corresponding to the location at the end of the filmstrip when wound into said light tight film container for bearing against and damaging said picker element of said camming means.

4. The lens fitted photographic film package of claim 3 wherein said picker element of said camming means is a tab shaped element projecting outwardly from the center of rotation of the camming means and weakened at its juncture with said camming means sufficiently to be damaged by said disk carried damaging means.

5. A recyclable lens-fitted photographic film package having an externally operable shutter member for effecting an exposure of a film frame and an externally operable film advance member for advancing to the next exposure frame after making an exposure comprising:
a light tight film casing having a shutter opening through which said exposure is made when said externally operable shutter member is operated;
an unexposed filmstrip disposed between a supply roll on one side of said shutter opening and a film winding spool disposed on the other side of said shutter opening from said film roll, one end of said filmstrip being attached to said film winding spool; and
winding control means responsive to operation of said externally operable advance member for causing said film winding spool to rotate so as to advance said filmstrip to the next exposure frame after a preceding exposure, said winding control means including means responsive to the advance of a predetermined exposure of the filmstrip container for effecting permanent damage to a portion of said winding control means to prevent the effective reuse of the photographic film package.

6. A recyclable, single use, photographic film package of the type having a camera mechanism fitted with a lens, a shutter release, a film advance mechanism, and an exposure counter and containing an unexposed filmstrip, wherein the filmstrip is advanced past an exposure image area, the exposure frames are indicated by the exposure counter and the filmstrip is exposed by the operation of the shutter release successively until all frames are exposed and wound upon a spool, wherein the improvement comprises:
means operating upon exposure of all image frames of the photographic filmstrip for damaging a component of the camera mechanism to inhibit unauthorized reuse thereof without replacement of the damaged component.

7. The photographic film package of claim 6 having an externally operable shutter member for effecting an exposure and an externally operable film advance member for winding the filmstrip into a light-tight film container and advancing the filmstrip to the next exposure frame after making an exposure, wherein the improvement further comprises:
winding control means responsive to operation of said externally operable advance member for allowing said film spool to rotate so as to enable said filmstrip to be advanced by only one frame after every exposure; and
means responsive to the winding of the last exposure of the filmstrip into said light-tight film container for effecting permanent damage to a portion of said winding control means to prevent the effective reuse of the camera mechanism of the photographic film package.

8. The lens-fitted photographic film package of claim 7 wherein said winding control means further comprises:
camming means drive by movement of said filmstrip past said exposure image area and providing at least one camming surface and a picker element;
lever means adapted to be engaged against said camming surface for effecting release of said externally operable frame advance member after operation of said externally operable shutter member for allowing said filmstrip to be advanced past said exposure image area until said camming means reaches its initial position and thereafter locking said film advance member;
frame counter means driven by said picker of said camming means for providing a series of frame members, one of which is adapted to be viewed at a time by the user; and
means associated with said frame counter means for damaging said camming means upon winding the last exposure on the filmstrip into said light-tight film container and when said frame counter means indicates no film frame capable of being exposed remaining.

9. The lens-fitted photographic film package of claim 8 wherein said frame counter means further comprises:

a flat disk having a series of alphanumeric characters on its flat surface and evenly spaced teeth on its periphery adapted to be engaged by said picker element during each rotation of said camming means to advance a further decremented character into view by the user; and damaging means carried by said disk in a location corresponding to the location at the end of the filmstrip when wound into said light-tight film container for bearing against and damaging said picker element of said camming means.

10. The lens-fitted photographic film package of claim 9 wherein said picker element of said camming means is a tap-shaped element projecting outwardly from the center of rotation of the camming means and weakened at its juncture with said camming means sufficiently to be damaged by said disk-carried damaging means.

* * * * *

UNITED STATES PATENT AND TRADEMARK OFFICE
CERTIFICATE OF CORRECTION

PATENT NO. : 5,235,366
DATED : August 10, 1993
INVENTOR(S) : Douglas E. Kucmerowski It is certified that error appears in the above-indentified patent and that said Letters Patent is hereby corrected as shown below:

Column 1, line 24, delete "size".

Column 1, line 51, "one" should read —the—.

Column 2, line 52, delete "of".

Column 3, line 10, delete "the".

Column 8, line 59, "members" should read —numbers—.

Column 10, line 5, "tap-shaped" should read —tab-shaped—.

Signed and Sealed this

Twenty-eight Day of March, 1995

Attest:

BRUCE LEHMAN

Attesting Officer     Commissioner of Patents and Trademarks